United States Patent [19]

Echigo et al.

[11] Patent Number: 4,479,535
[45] Date of Patent: Oct. 30, 1984

[54] RECUPERATIVE RADIANT TUBE

[75] Inventors: Ryozo Echigo, 3-17-603, Ecchujima 1-chome, Kohtoh-ku, Tokyo; Takaaki Noda, Aichi; Koichiro Kinto, Mie; Kenjiro Sato, Aichi, all of Japan

[73] Assignees: Daidotokushuko Kabushikikaisha; Ryozo Echigo, both of Japan

[21] Appl. No.: 400,325

[22] Filed: Jul. 21, 1982

[30] Foreign Application Priority Data

Jul. 24, 1981 [JP] Japan ................. 56-116877

[51] Int. Cl.³ ............................ F27B 5/14; F28D 7/12
[52] U.S. Cl. ................................. 165/142; 165/134 R; 165/DIG. 12; 126/91 A
[58] Field of Search ................. 122/20 B, 131, 367 R, 122/367 A, 367 C, 421; 126/91 A; 165/119, 134 R, 134 DP, 142, DIG. 12; 431/247, 353, 215; 432/29, 209

[56] References Cited

U.S. PATENT DOCUMENTS 3,946,719  3/1976  Bark et al. ................. 126/91 A
4,111,258  9/1978  Jahns et al. ................. 165/142 X
4,310,303  1/1982  Collier ................. 126/91 A X

FOREIGN PATENT DOCUMENTS 997750   1/1952   France ........................ 432/209
108792   4/1925   Switzerland .................. 165/142
907504   10/1962  United Kingdom ........... 126/91 A
2041181  9/1980   United Kingdom ........... 122/367 R
2075658  11/1981  United Kingdom ........... 165/162
463725   8/1975   U.S.S.R. ..................... 432/209

Primary Examiner—William R. Cline
Assistant Examiner—Edward P. Walker
Attorney, Agent, or Firm—William A. Drucker

[57] ABSTRACT

A radiant tube to be heated by high-temperature gases supplied from its one end. The tube supplys a heat radiation by being thus heated. The gases used for the heating are discharged from the other end of the tube. Inside the tube a heat exchanger is provided in the proximity of the gas outlet of the tube so as to recover thermal energy from the used gases before they come out from the outlet.

4 Claims, 7 Drawing Figures different sections of air-permeable solid matter along its thickness

RECUPERATIVE RADIANT TUBE

BACKGROUND OF THE INVENTION

1. Field of the Invention

This invention relates to radiant tubes for use in heating various materials such as steel pieces, other kinds of solid matters, or fluids in a heating furnace.

2. Description of the Prior Art

In the conventional radiant tube, when high-temperature gases produced by a burner are supplied into the tubular radiator section from one end thereof, the radiator section is increased in its temperature to radiate heat. The gases thus used for heating the radiator are then discharged from the other end thereof.

When thus flowing out of the radiator, the gases still have a higher temperature; accordingly, in the past, the inventors herein made an attempt to recover heat from the exhaust gases by locating a heat exchanger within the radiator in a position nearer to its exhaust end. Such a heat exchanger, however, is of a lower temperature so that it may reduce the temperature of its surroundings. Such a lowering of the temperature of the radiator prevents the satisfactory heat radiation for heating the materials.

SUMMARY OF THE INVENTION

An object of the invention is to provide a radiant tube including a heat exchanger located so as to stretch over both radiator section and outflow section of the tube for the purpose of recovering heat from hot combustion gases used for heating the radiator section when the gases flow from the radiator section to the outflow section.

Another object of the invention is to provide a radiant tube of such a construction that a heat exchanger projecting into a radiator section has no thermal or cooling effect on the radiator section, but the same section is increased in its temperature not only by the direct heating by the flow of hot combustion gases, but by a unique feature.

That is, according to the invention, a tubular partition means of air-permeable solid matter is disposed between the cylindrical wall of the radiator section and the projecting or forward end of the heat exchanger so that the hot gases having heated the radiator section pass the partition means to come thereinto. At this time a certain amount of heat is given to the partition means by the gases, with the outer side of the same means being increased to a higher temperature so as to radiate a great amount of heat so that the radiator section, enclosing the partition means, is further increased in its temperature. And, in turn, the radiator section supplys a greater amount of heat radiation for the more effective heating of materials. Also the air-permeable partition, enclosing the projecting end of the heat exchanger, provides a means for preventing the heat exchanger, namely, an object of lower temperature, from depriving the radiator section of its heat so that the exchanger can have no cooling effect on the same section.

A still another object of the invention is to provide a radiant tube which makes it possible to recover a further amount of heat of the hot gases by the heat exchanger at a greater rate after the gases have passed the foregoing partition means.

That is, according to the invention, not only the foregoing partition means is provided in the manner mentioned, but another tubular partition means of air-permeable solid matter is so disposed as to enclose that portion of the heat exchanger located inside the outflow section so that the hot gases having passed the first partition means and entered thereinto must also enter and pass the second partition means in order to come out from the radiant tube. When passing the second partition means, the gases further transfer their heat to the same partition means so that this means is increased to a higher temperature at its inner side than at its outer side, unlike in the first partition means, because of the heat-radiation properties of the air-permeable solid matter. Therefore, the heat exchanger is heated not only by the hot gases flowing through the space defined by the two partition means, but by the second partition means supplying an inward radiation of no small amount of heat. The recovery of heat by the heat exchanger is thus made very effectively.

Other objects and advantages of the invention will become apparent during the following discussion of the accompanying drawings.

DESCRIPTION OF THE PREFERRED EMBODIMENTS

Figure 1:
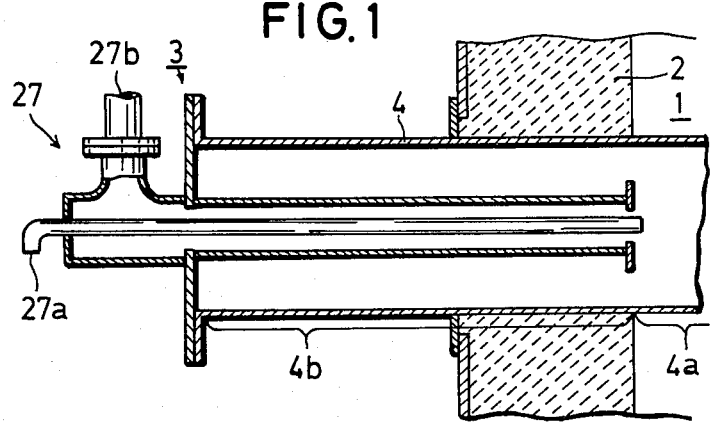
FIG. 1 is a vertical cross section of a forward portion of a first embodiment of radiant tube according to the invention.
Figure 2:
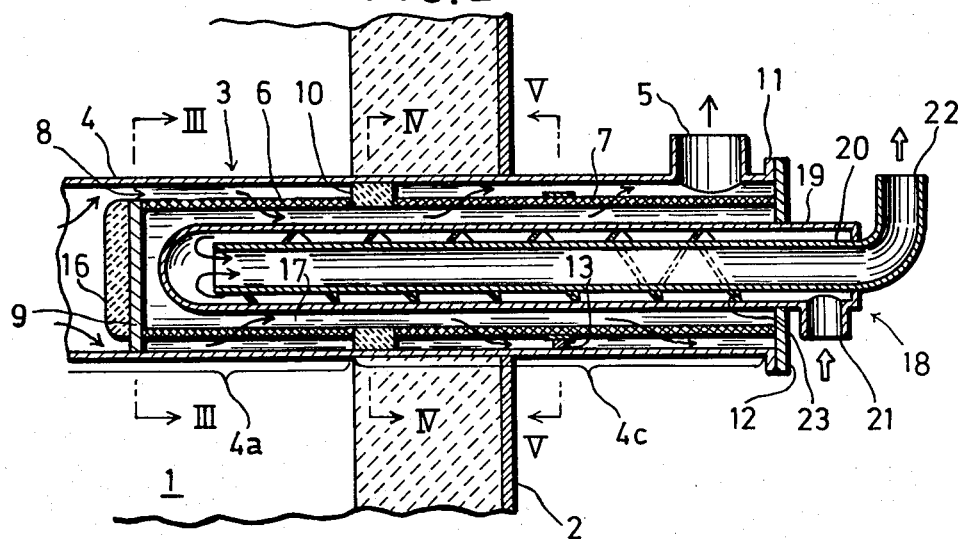
FIG. 2 is a vertical cross section of the remaining portion of the radiant tube of FIG. 1.
Figure 3:
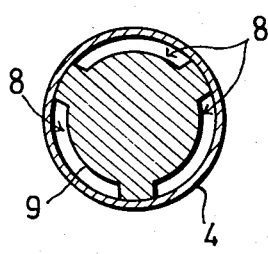
FIG. 3 is a cross section taken on the line III—III of FIG. 2.
Figure 4:
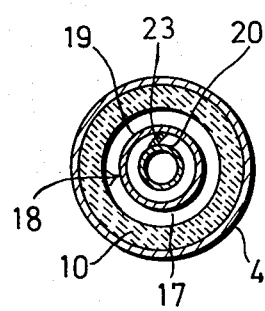
FIG. 4 is also a cross section taken on the line IV—IV of FIG. 2.
Figure 5:
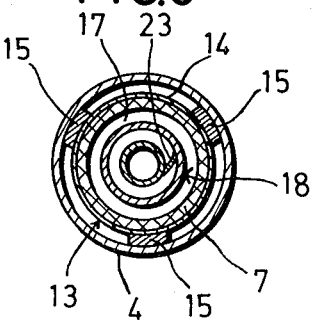
FIG. 5 is also a cross section taken on the line V—V of FIG. 2.

Referring to FIGS. 1 to 5, a radiant tube 3 is so located as to extend through opposite walls 2 of a heating furnace including a heating chamber 1. The radiant tube 3 includes a tubular body 4 comprising a radiator section 4a located inside the heating chamber 1, an inflow section 4b connected to the radiator section 4a at its one end and projecting outward from one of the furnace walls 2 at its other end, and an outflow section 4c connected to the radiator section 4a at its one end on the opposite side of the inflow section 4b and projecting outward from the other or opposite furnace wall 2 at its other end. The inflow section 4b includes a burner 27 provided with a fuel-supply port 27a and an air-supply port 27b so that a supply of fuel from the port 27a is burned with the help of a supply of air from the port 27b, producing hot combustion gases to be supplied into the tube 3 so as to heat the radiator section 4a. The outflow section 4c has an outlet 5 for allowing the gases used for heating the radiator section 4a to discharge from the tube 3. Inside the tube 3 are disposed a first partition means 6 and a second partition means 7 which both are constructed of air-permeable solid matter into the shape of a tube. In the embodiment herein the partitions 6 and 7 each are constructed of eight stainless-steel wire nets (of 0.6 mm. in wire diameter and of 16 meshes)

connected to one another in layers to a thickness of 10 mm. One end of the first partition 6 is entirely connected to a circular support plate 9 which is constructed of material not permeable to air, but provided with a number of air holes 8 at its circumference. The other end of the same partition 6 is also entirely connected to an annular heat-resistant support means 10 constructed of material not permeable to air. Also, one end of the second partition means 7 is entirely connected to the support means 10, while its other end is also entirely connected to a lid 12 which is removably attached to a flange 11 connected to the right-hand end (in FIG. 2) of the tubular body 4. The air-permeable solid matter as the partitions 6 and 7 may be heat-resistant material such as metal or ceramics. Also, the partitions 6 and 7 each may be of any suitable air-permeable construction other than wire netting, such as honeycomb-like shape, fibrous or porous structure having a suitable thickness. It may be considered that the air-permeable solid body is equivalent, in construction, to a number of small-sized spheral objects or wires united in one body; that is, the air-permeable solid body has a very large area of occupied surface (i.e., one that is not vacant), so that when gases are allowed to pass through the solid body, the transference of heat by convection is made at a greater rate. Numeral 13 designates a means for supporting the second partition 7 at its intermediate portion, which means 13 comprises a band 14 attached to the outer circumference of the second partition 7 and a plurality of legs 15 projecting from the band 14. The support plate 9, support means 10 and 13 are all disposed in the tubular body 4 in such a manner that they are allowed to move along the length of the body 4. Numeral 16 designates a circular heat-resistant protector connected to the front face of the support plate 9. As clearly shown in FIG. 2, the front face of the support means 10 (i.e., one that is nearer to the burner 27) is flush with the inner surface of the right-hand furnace wall 2. Also, the outer circumference of the first partition 6 is directly faced with the inner surface of that portion of the tubular body 4 forming the radiator section 4a. Numeral 17 designates a heat-exchange chamber defined by the support plate 9, first and second partitions 6 and 7, and lid 12. This chamber 17 includes a bayonet exchanger 18 for preheating air to be used for combustion of the fuel, which exchanger 18 is of a double-tube construction including an outer one 19 and an inner one 20. The outer tube 19 is connected to and supported by the lid 12. Also the outer tube 19 is provided with an inlet 21 to allow air from an air blower (not shown) to come into the tube 19. The inner tube 20 is provided with an outlet 22 to discharge the air preheated by the exchanger 18, which outlet 22 is connected to the burner 27 by means of a supply pipe (not shown). The inner tube 20 is supported by a spiral support or fins 23 which are provided between the two tubes 20 and 19 and are so designed as to allow the maximum contact of the air from the inlet 21 with the outer tube 19.

In the radiant tube 3 with the foregoing construction, when fuel is burned by the burner 27, hot combustion gases with a temperature of approximately 1,100° C. are produced and allowed to flow into the tube 3 so as to heat the tubular body 4 primarily by the transference of heat by convection, so that the heated body 4 radiates heat. In this process the radiator section 4a of the body 4 (located inside the heating chamber 1) heats the material supplied into the chamber 1 for treatment, as is well known. The gases then come from the space between body 4 and first partition 6 into the heat-exchange chamber 17. At this time, i.e., when the gases pass the partition 6, the same partition is heated thereby up to a temperature close to that of the gases as the partition 6 has a very large area of occupied surface as mentioned before. And the partition 6 is heated to a higher temperature at its outer side than at its inner side. The partition 6 thus increased in temperature radiates heat so that the radiator section 4a of the body 4, particularly that portion of the same section surrounding the partition 6, is given an increased temperature, providing a further heat radiation for the material. When the gases have thus passed the partition 6, they are reduced in temperature by 200° C. to 400° C. and make their way through the heat-exchange chamber 17 while heating the heat exchanger 18 primarily by the transference of heat by convection. The gases then come from the chamber 17 through the second partition 7, heating the same partition in the same manner as when passing the first one 6 so that they are further reduced in temperature by 100° C. to 300° C. to have a temperature of approximately 400° C. when coming out from the outlet 5. In such a process the outer tube 19 of the heat exchanger 18 is heated not only by the hot gases flowing into the chamber 17 while transferring heat by convection, but also by both partitions 6 and 7 radiating heat, so that the air for use in the combustion of fuel is sufficiently preheated in the exchanger 18 for supply to the burner 27.

The air supplied into the outer tube 19 from the inlet 21 for preheating has a very low temperature compared with the hot gases flowing outside the tube 19; therefore, when the air is preheated by the gases (heating the tube 19), a great amount of thermal energy is given to the air with a higher rate of heat recovery.

Although not shown in the drawings, the partitions 6 and 7 may be united in one body with the support means 10 connected to its outer circumference.

Figure 6:
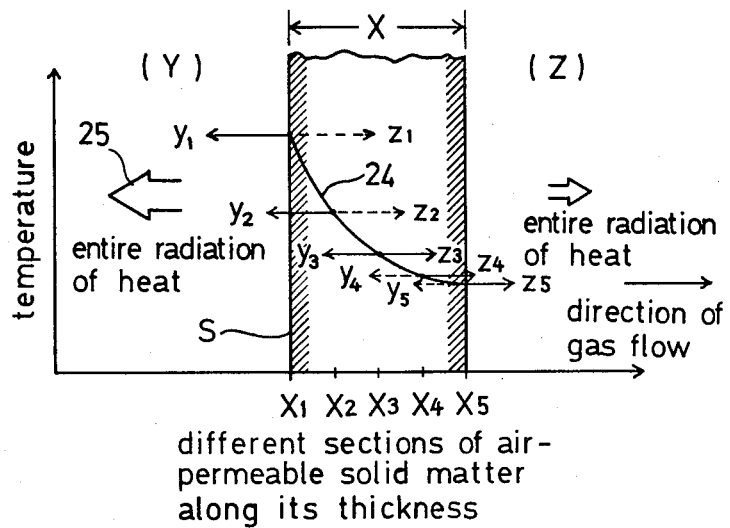
FIG. 6 is a graphic illustration of how an air-permeable solid matter as the material of parition means radiates heat given by hot combustion gases passing the same solid matter.

Referring to FIG. 6, a description will be made of how the air-permeable solid matter as the material of partitions 6 and 7 radiates energy. The air-permeable solid matter S has the thickness X in the direction of gas flow, and has a temperature gradient indicated by a curved line 24 in its thickness when the hot gases have been allowed to pass the solid matter while transferring its heat thereto by convection. And different sections $X_1$ to $X_5$ along the thickness X radiate thermal energies $y_1$ to $y_5$ and $Z_1$ to $Z_5$, respectively, which energies $y_1$ to $y_5$ are to come from the solid matter to the upstream side (Y) of the gas flow, while those $Z_1$ to $Z_5$ to come therefrom to the downstream side (Z) thereof; however, those $Z_1$, $Z_2$, $Y_4$, and $Y_5$ of the radiant energies must travel the entire thickness X or a greater part thereof in order to come out from the solid matter, and in such a process these radiant energies are attenuated by the solid matter itself before coming therefrom. The major amount of the whole radiant energies, therefore, comes to the upstream side (Y) of the gas flow as indicated by numeral 25 (FIG. 6), so that such energies are effectively used for heating the radiator section 4a of the tubular body 4 in particular when they have been radiated from the first partition 6, while such energies are also effectively used for heating the heat-exchanger 18 in particular when they have been radiated from the second partition 7. Also it has been found that if any amount of heat existing on the downstream side (Z) of the gas flow is removed therefrom, the air-permeable solid matter S for all practical purposes prevents the lowered temperature on the downstream side (Z) from having any thermal effect on the atmosphere on the upstream side (Y); therefore, according to the invention, the heat exchanger 17 located on the downstream side of the gas flow inside the first partition 6 may take away a certain amount of heat from the hot gases without affecting the temperature of that portion of the tubular body 4 located on the upstream side of the first partition 6 in any substantial ways, that is, without practically cooling the same portion of the body 4.

Figure 7:
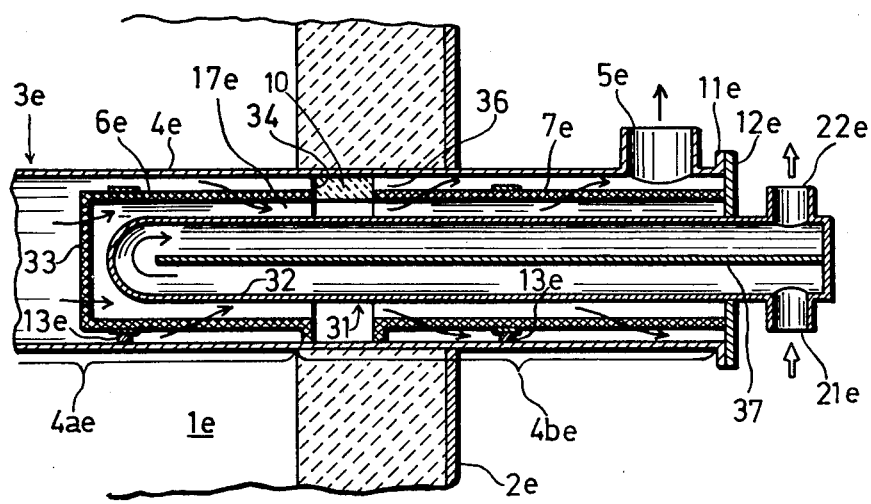
FIG. 7 is a similar view to FIG. 2, showing a second embodiment of radiant tube according to the invention.

Referring to FIG. 7, another embodiment of the radiant tube construction may be such that a first partition means 6e is supported by a support means 13e (similar to the preceding one 13) and an air-permeable flange 34 and closed by an air-permeable plate 33 at its forward end and that a second partition means 7e is also supported by an air-permeable flange 36 at its one end. Also, in this embodiment, a heat exchanger 31 may be of such a construction that the inside of a tubular body 32 is divided by a horizontal partition means 37 into upper and lower halves, except for the forward end thereof. In such a construction of heat exchanger, air to be heated therein is supplied into the lower space and heated therein to have a reduced weight, and then takes its way very smoothly through the upper space to come out from the exchanger.

In the second embodiment, portions or sections identical or similar to those of the first embodiment of FIGS. 1 to 5 in function are designated by the same numerals as the preceding portions and the alphabetical letter e attached thereto.

In the foregoing two embodiments, the purpose of each heat exchanger is to preheat the air to be used for the combustion of fuel; however, the exchanger may be employed for heating the atmosphere in the furnace or other various fluids.

Also, the invention has been described as being applied to the radiant tube for heating furnace employing combustion gases produced by the burner as high-temperature gas; however, in addition, the invention may be applied to radiant tubes for a wide variety of uses and constructions which employ various high-temperature gases such as those for use in a salt bath or hothouse.

What is claimed is:

1. A radiant tube comprising a tubular radiator section directly communicating with an inflow section at one end thereof and with an outflow section at the other end thereof so as to provide a continuous inner cylindrical space through the tube so that high-temperature gases are allowed to enter the tube from said inflow section, increase the temperature of said radiator section in order for the same radiator section to radiate heat, and come out from said outflow section, which tube further includes:
    (a) a heat exchanger disposed to extend through said outflow section and project into said radiator section to define a cylindrical space thereby over both said outflow section and radiator section;
    (b) annular gas impermeable support means disposed at the interface of said radiator section and said outflow section;
    (c) a first tubular partition means formed of air-permeable solid matter which is located between said gas impermeable support means and the projecting end of said heat exchanger to enclose said projecting end of said heat exchanger on an upstream side of the gas flow relative to the location of said heat exchanger so that the high-temperature gases having heated said radiator section must pass through said first partition means and come thereinto in order to flow into said outflow section;
    (d) removable gas impermeable lid means at the downstream end of said outflow section; and
    (e) a second tubular partition means formed of air-permeable solid matter which is located between said lid means and said support means to enclose said portion of said heat exchanger on a downstream side of the gas flow relative to the location of said heat exchanger so that the gases having come into said first partition means must enter and pass through said second partition means in order to come out from the radiant tube.

2. A radiant tube of claim 1 further including a support plate of material not permeable to air located inside said radiator section in a position nearer to said inflow section than the location of said heat exchanger so as not to allow the high-temperature gases to pass through said support plate, and an outlet means provided at the cylindrical wall of said outflow section for discharging the gases, said radiant tube being further characterized in that said first tubular partition means is connected to said support plate at one entire annular end thereof and also connected to said annular support means at the other entire annular end thereof, while said second tubular partition means is connected to said annular support means at one entire annular end thereof and also connected to said lid means at the other entire annular end thereof, and said support plate includes a number of air holes communicating with both that portion of the inner space of said radiator section located on a more upstream side of the gas flow than said support means and the space between the cylindrical wall of said radiator section and said first partition means so as to allow the high-temperature gases to pass therethrough to flow into said in-between space.

3. A radiant tube of claim 1 or 2 wherein said heat exchanger comprises an outer tube closed at one end thereof and provided with a gas inlet at the other end thereof and an inner tube inserted into said outer tube so as to provide said heat exchanger with a double-tube construction and opened, at one end thereof, into said outer tube in close proximity to said closed end of said outer tube and provided with a gas outlet at the other end thereof.

4. A radiant tube of claim 1 wherein said heat exchanger comprises a tubular body substantially divided into upper and lower halves by a horizontal partition plate in its upper space, but provided with a portion allowing said lower space to communicate with said upper space and said tubular body includes a gas inlet communicating with said lower space and a gas outlet communicating with said upper space.

* * * * *